United States Patent
Koo et al.

(10) Patent No.: US 11,738,638 B2
(45) Date of Patent: Aug. 29, 2023

(54) HYDROGEN STORAGE SYSTEM AND FLOW RATE ADJUSTING VALVE USED FOR SAME

(71) Applicants: Hyundai Motor Company, Seoul (KR); Kia Motors Corporation, Seoul (KR)

(72) Inventors: Jin Woo Koo, Seoul (KR); Myung Ju Jung, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 229 days.

(21) Appl. No.: 17/034,223

(22) Filed: Sep. 28, 2020

(65) Prior Publication Data
US 2021/0284012 A1  Sep. 16, 2021

(30) Foreign Application Priority Data
Mar. 16, 2020  (KR) .................. 10-2020-0032209

(51) Int. Cl.
*B60P 3/00* (2006.01)
*B60K 15/03* (2006.01)
*B60K 15/01* (2006.01)

(52) U.S. Cl.
CPC ...... *B60K 15/03006* (2013.01); *B60K 15/013* (2013.01); *B60K 2015/03026* (2013.01);
(Continued)

(58) Field of Classification Search
CPC ....... B01F 23/10; B60K 15/01; B60K 15/013; B60K 15/03006; B60K 2015/03026;
(Continued)

(56) References Cited

U.S. PATENT DOCUMENTS

| 2004/0123898 A1* | 7/2004 | Yamashita | .......... F16K 31/1635 137/7 |
| 2006/0016512 A1* | 1/2006 | Takano | ................... F17C 5/007 141/82 |

(Continued)

FOREIGN PATENT DOCUMENTS

| FR | 2577903 A1 * | 8/1986 |
| JP | 2004031234 A * | 1/2004 |
| JP | 3936037 B2 * | 6/2007 |

*Primary Examiner* — Long T Tran
*Assistant Examiner* — James J Kim
(74) *Attorney, Agent, or Firm* — Fox Rothschild LLP

(57) ABSTRACT

A hydrogen storage system includes: a first hydrogen tank provided in a fuel cell electric vehicle; a second hydrogen tank provided in the fuel cell electric vehicle and configured to store hydrogen independently of the first hydrogen tank; a manifold provided in the fuel cell electric vehicle and connected to the first hydrogen tank and the second hydrogen tank; a hydrogen supply line configured to connect the manifold and a fuel cell stack provided in the fuel cell electric vehicle; and a flow rate adjusting valve configured to adjust a flow rate of the hydrogen to be supplied to the manifold from at least one of the first hydrogen tank or the second hydrogen tank in accordance with a difference in pressure between the first hydrogen tank and the second hydrogen tank, so as to minimize a difference in pressure between the hydrogen tanks to improve safety and reliability.

15 Claims, 5 Drawing Sheets

(52) U.S. Cl.
CPC .............. *B60K 2015/03118* (2013.01); *B60K 2015/03315* (2013.01)

(58) Field of Classification Search
CPC .................... B60K 2015/03118–03144; B60K 2015/03315; F16K 17/18; F16K 17/19; F16K 17/196; F16K 1/302; F16K 1/303; Y02E 60/32; F17C 2221/012; H01M 8/04089; B60L 3/0053
USPC ........................................................ 220/562
See application file for complete search history.

(56) References Cited

U.S. PATENT DOCUMENTS

| | | | | |
|---|---|---|---|---|
| 2006/0032532 A1* | 2/2006 | Suess | .................... | F17C 13/083 |
| | | | | 137/266 |
| 2006/0283510 A1* | 12/2006 | Pechtold | .................... | F16K 1/44 |
| | | | | 137/625.5 |
| 2009/0269624 A1* | 10/2009 | Hwang | .................. | B60K 15/10 |
| | | | | 429/421 |
| 2012/0131991 A1* | 5/2012 | Ye | ......................... | B60L 3/0069 |
| | | | | 73/114.53 |
| 2016/0116450 A1* | 4/2016 | Saito | ..................... | B60L 3/0053 |
| | | | | 73/31.04 |
| 2018/0135616 A1* | 5/2018 | Adams | .................. | F04B 43/009 |
| 2021/0094409 A1* | 4/2021 | Komiya | ............... | B60K 15/013 |

* cited by examiner

HYDROGEN STORAGE SYSTEM AND FLOW RATE ADJUSTING VALVE USED FOR SAME

CROSS-REFERENCE TO RELATED APPLICATIONS

This application claims under 35 U.S.C. § 119(a) the benefit of Korean Patent Application No. 10-2020-0032209 filed in the Korean Intellectual Property Office on Mar. 16, 2020, the entire contents of which are incorporated herein by reference.

BACKGROUND

(a) Technical Field

The present disclosure relates to a hydrogen storage system and a flow rate adjusting valve used for the same, more particularly, to the hydrogen storage system and the flow rate adjusting valve which are capable of minimizing a difference in pressure between hydrogen tanks so as to improve safety and reliability.

(b) Description of the Related Art

A fuel cell electric vehicle (FCEV) produces electrical energy from an electrochemical reaction between oxygen and hydrogen in a fuel cell stack and uses the electrical energy as a power source.

The fuel cell electric vehicle may continuously generate electricity by being supplied with fuel and air from the outside regardless of a capacity of a battery, and thus has high efficiency, and emits almost no contaminant Research and development continues to be conducted on various aspects of the fuel cell electric vehicle.

A plurality of hydrogen tanks (e.g., three hydrogen tanks) is provided in the fuel cell electric vehicle, and hydrogen is stored in the hydrogen tanks along a hydrogen charging line of a hydrogen storage system. The hydrogen stored in the hydrogen tanks is depressurized by a regulator, supplied to the fuel cell stack along a hydrogen supply line, and then used to produce electrical energy.

Meanwhile, when a difference in pressure between the plurality of hydrogen tanks is increased to a predetermined degree or more, there is a problem in that a sealing performance of a high-pressure hydrogen valve (e.g., a solenoid valve), which maintains a pressure in the hydrogen tank when the fuel cell electric vehicle is turned off, deteriorates, and a risk of leakage of hydrogen is increased. Further, there is a problem in that abnormal operating noise occurs due to chattering of the high-pressure hydrogen valve caused by a differential pressure between the plurality of hydrogen tanks when the fuel cell electric vehicle is restarted. Therefore, a difference in pressure between the respective hydrogen tanks needs to be minimized.

However, in the related art, there is a problem in that a differential pressure occurs between the hydrogen tanks due to a difference in length between pipes connected to the respective hydrogen tanks, and a difference in pressure between the respective hydrogen tanks occurs due to a deviation in internal temperature between the hydrogen tanks which is caused by sunlight and wind generated when the fuel cell electric vehicle travels.

Therefore, research has been conducted to minimize a difference in pressure between the hydrogen tanks and improve safety and reliability, but the result of such research is still insufficient. Accordingly, there is a need for development of a technology for minimizing a difference in pressure between the hydrogen tanks to improve safety and reliability.

SUMMARY

The present disclosure provides a hydrogen storage system and a flow rate adjusting valve used for the same which are capable of minimizing a difference in pressure between hydrogen tanks to improve safety and reliability.

The present disclosure may minimize a difference in pressure between hydrogen tanks by changing a flow rate of hydrogen to be supplied from the respective hydrogen tanks in accordance with the difference in pressure between the hydrogen tanks.

The present disclosure may improve leakproof sealability, reduce a risk of leakage of hydrogen, and minimize chattering of a valve caused by a differential pressure.

In order to achieve the above-mentioned objects of the present disclosure, an aspect of the present disclosure provides a hydrogen storage system including: a first hydrogen tank provided in a fuel cell electric vehicle; a second hydrogen tank provided in the fuel cell electric vehicle and configured to store hydrogen independently of the first hydrogen tank; a manifold provided in the fuel cell electric vehicle and connected to the first hydrogen tank and the second hydrogen tank; a hydrogen supply line configured to connect the manifold and a fuel cell stack provided in the fuel cell electric vehicle; and a flow rate adjusting valve configured to adjust a flow rate of the hydrogen to be supplied to the manifold from at least one of the first hydrogen tank or the second hydrogen tank in accordance with a difference in pressure between the first hydrogen tank and the second hydrogen tank.

This is to minimize a difference in pressure between the hydrogen tanks and improve safety and reliability.

That is, when a difference in pressure between the plurality of hydrogen tanks is increased to a predetermined degree or more, there is a problem in that a sealing performance of a high-pressure hydrogen valve, which maintains a pressure in the hydrogen tank, deteriorates, and a risk of leakage of hydrogen is increased. Further, there is a problem in that abnormal operating noise occurs due to chattering of the high-pressure hydrogen valve. Therefore, a difference in pressure between the respective hydrogen tanks needs to be minimized. However, in the related art, there is a problem in that a differential pressure occurs between the hydrogen tanks due to a difference in length between pipes connected to the respective hydrogen tanks, and a difference in pressure between the respective hydrogen tanks occurs due to a deviation in internal temperature between the hydrogen tanks which is caused by sunlight and wind generated when the fuel cell electric vehicle travels.

However, according to the exemplary embodiment of the present disclosure, a flow rate of the hydrogen to be supplied to the manifold from at least one of the first hydrogen tank or the second hydrogen tank is adjusted in accordance with a difference in pressure between the first hydrogen tank and the second hydrogen tank, and as a result, it is possible to obtain an advantageous effect of minimizing the difference in pressure between the first hydrogen tank and the second hydrogen tank.

This is based on the fact that the pressure in the hydrogen tank may be adjusted by adjusting a flow rate of hydrogen to be discharged from the hydrogen tank. For example, when a pressure in the first hydrogen tank becomes a first pressure and a pressure in the second hydrogen tank becomes a second pressure lower than the first pressure, the pressure in the first hydrogen tank may be decreased by increasing the flow rate of the hydrogen to be discharged from the first hydrogen tank, and as a result, the difference in pressure between the first hydrogen tank and the second hydrogen tank may be minimized.

According to the exemplary embodiment of the present disclosure, in accordance with a difference in pressure between the first hydrogen tank and the second hydrogen tank, only the flow rate of the hydrogen to be supplied from the first hydrogen tank to the manifold may be adjusted, both the flow rates of the hydrogen to be supplied to the manifold from the first hydrogen tank and the second hydrogen tank may be adjusted, or only the flow rate of the hydrogen to be supplied from the second hydrogen tank to the manifold may be adjusted. According to another exemplary embodiment of the present disclosure, the flow rate adjusting valve may adjust a flow rate of hydrogen to be supplied to the manifold from at least one of the plurality of hydrogen tanks in accordance with a difference in pressure between the first hydrogen tank and the third hydrogen tank or a difference in pressure between the second hydrogen tank and the third hydrogen tank.

The flow rate adjusting valve may have various structures capable of adjusting the flow rate of the hydrogen to be supplied from the hydrogen tank to the manifold.

In particular, the flow rate adjusting valve may be provided in the manifold. Alternately, the flow rate adjusting valve may be provided in at least one of a first connection line configured to connect the first hydrogen tank and the manifold or a second connection line configured to connect the second hydrogen tank and the manifold.

According to the exemplary embodiment of the present disclosure, the flow rate adjusting valve may include: a chamber housing having an operating chamber that communicates with the first hydrogen tank and the second hydrogen tank; a first valve housing having a first supply flow path connected to the first hydrogen tank; a piston member configured to rectilinearly move in the operating chamber in accordance with a difference in pressure between the first hydrogen tank and the second hydrogen tank; and a first valve member connected to one end of the piston member and configured to adjust an opening ratio of the first supply flow path by being moved in the first valve housing by the piston member.

In particular, the operating chamber of the chamber housing may be divided into a first space and a second space by the piston member, the first hydrogen tank may communicate with the first space, and the second hydrogen tank may communicate with the second space.

According to the exemplary embodiment of the present disclosure, the hydrogen storage system may include a spring member configured to elastically support a movement of the piston member relative to the chamber housing.

According to the exemplary embodiment of the present disclosure, the flow rate adjusting valve may include: a second valve housing having a second supply flow path connected to the second hydrogen tank; and a second valve member connected to the other end of the piston member and configured to adjust an opening ratio of the second supply flow path by being moved in the second valve housing by the piston member.

This is to adjust both a flow rate of the hydrogen to be discharged from the first hydrogen tank (supplied to the manifold) and a flow rate of the hydrogen to be discharged from the second hydrogen tank (supplied to the manifold) in accordance with a difference in pressure between the first hydrogen tank and the second hydrogen tank.

By adjusting both the flow rates of the hydrogen to be discharged from the first hydrogen tank and the second hydrogen tank as described above, it is possible to obtain an advantageous effect of more quickly and accurately correcting a deviation in pressure between the first hydrogen tank and the second hydrogen tank.

In particular, when a pressure in the first hydrogen tank becomes a first pressure and a pressure in the second hydrogen tank becomes a second pressure lower than the first pressure, the first valve member may move in a first direction in which the first valve member opens the first supply flow path, and a flow rate of the hydrogen to be supplied from the first hydrogen tank to the manifold may be increased.

More particularly, at a same time when the first valve member moves in the first direction, the second valve member may move in the first direction in which the second valve member closes the second supply flow path, and a flow rate of the hydrogen to be supplied from the second hydrogen tank to the manifold may be decreased.

Another aspect of the present disclosure provides a flow rate adjusting valve configured to adjust a flow rate of hydrogen to be supplied to a manifold from at least one of a first hydrogen tank or a second hydrogen tank, the flow rate adjusting valve including: a chamber housing having an operating chamber that communicates with the first hydrogen tank and the second hydrogen tank; a first valve housing having a first supply flow path connected to the first hydrogen tank; a piston member configured to rectilinearly move in the operating chamber in accordance with a difference in pressure between the first hydrogen tank and the second hydrogen tank; and a first valve member connected to one end of the piston member and configured to adjust an opening ratio of the first supply flow path by being moved in the first valve housing by the piston member.

According to the exemplary embodiment of the present disclosure, the operating chamber may be divided into a first space and a second space by the piston member, the first hydrogen tank may communicate with the first space, and the second hydrogen tank may communicate with the second space.

According to the exemplary embodiment of the present disclosure, the flow rate adjusting valve may include a spring member configured to elastically support a movement of the piston member relative to the chamber housing.

According to the exemplary embodiment of the present disclosure, the flow rate adjusting valve may further include: a second valve housing having a second supply flow path connected to the second hydrogen tank; and a second valve member connected to the other end of the piston member and configured to adjust an opening ratio of the second supply flow path by being moved in the second valve housing by the piston member.

According to the exemplary embodiment of the present disclosure, when a pressure in the first hydrogen tank becomes a first pressure and a pressure in the second hydrogen tank becomes a second pressure lower than the first pressure, the first valve member may move in a first direction in which the first valve member opens the first supply flow path, and a flow rate of the hydrogen to be supplied from the first hydrogen tank to the manifold may be increased.

According to the exemplary embodiment of the present disclosure, at a same time when the first valve member moves in the first direction, the second valve member may move in the first direction in which the second valve member closes the second supply flow path, and a flow rate of the hydrogen to be supplied from the second hydrogen tank to the manifold may be decreased.

DETAILED DESCRIPTION

Figure 1:
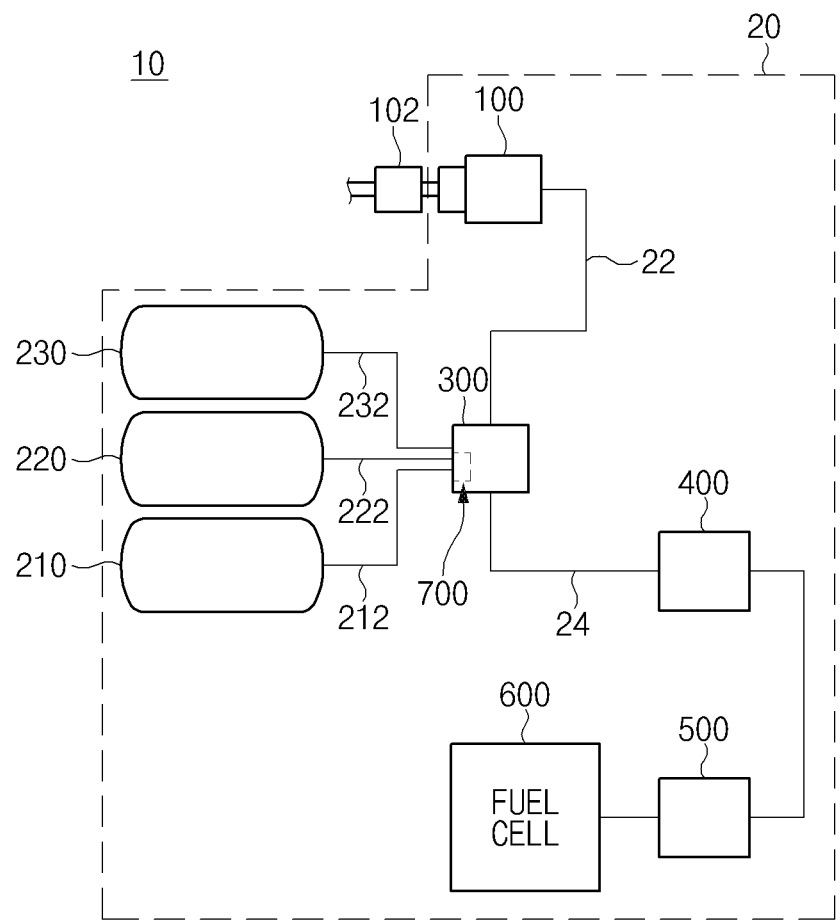
FIG. 1 is a view for explaining a hydrogen storage system according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings.

However, the technical spirit of the present disclosure is not limited to some exemplary embodiments described herein but may be implemented in various different forms. One or more of the constituent elements in the exemplary embodiments may be selectively combined and substituted within the scope of the technical spirit of the present disclosure.

In addition, unless otherwise specifically and explicitly defined and stated, the terms (including technical and scientific terms) used in the exemplary embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the exemplary embodiment of the present disclosure are for explaining the exemplary embodiments, not for limiting the present disclosure.

Unless particularly stated otherwise in the context of the present specification, a singular form may also include a plural form. The explanation "at least one (or one or more) of A, B, and C" described herein may include one or more of all combinations that can be made by combining A, B, and C.

In addition, the terms such as first, second, A, B, (a), and (b) may be used to describe constituent elements of the exemplary embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element can be connected, coupled, or attached directly to another constituent element or connected, coupled, or attached to another constituent element through still another constituent element interposed therebetween.

In addition, the explanation "one constituent element is formed or disposed above (on) or below (under) another constituent element" includes not only a case in which the two constituent elements are in direct contact with each other, but also a case in which one or more additional constituent elements are formed or disposed between the two constituent elements. In addition, the expression "up (above) or down (below)" may include a meaning of a downward direction as well as an upward direction based on one constituent element.

Figure 2:
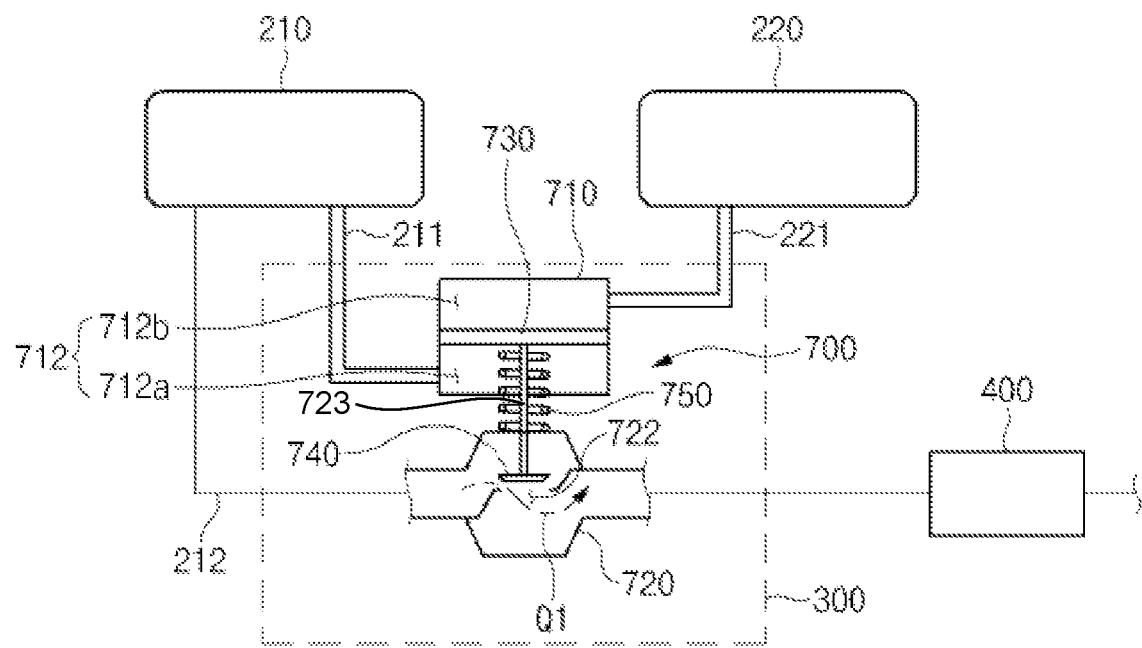
FIG. 2 is a view for explaining a flow rate adjusting valve of the hydrogen storage system according to the exemplary embodiment of the present disclosure.
Figure 3:
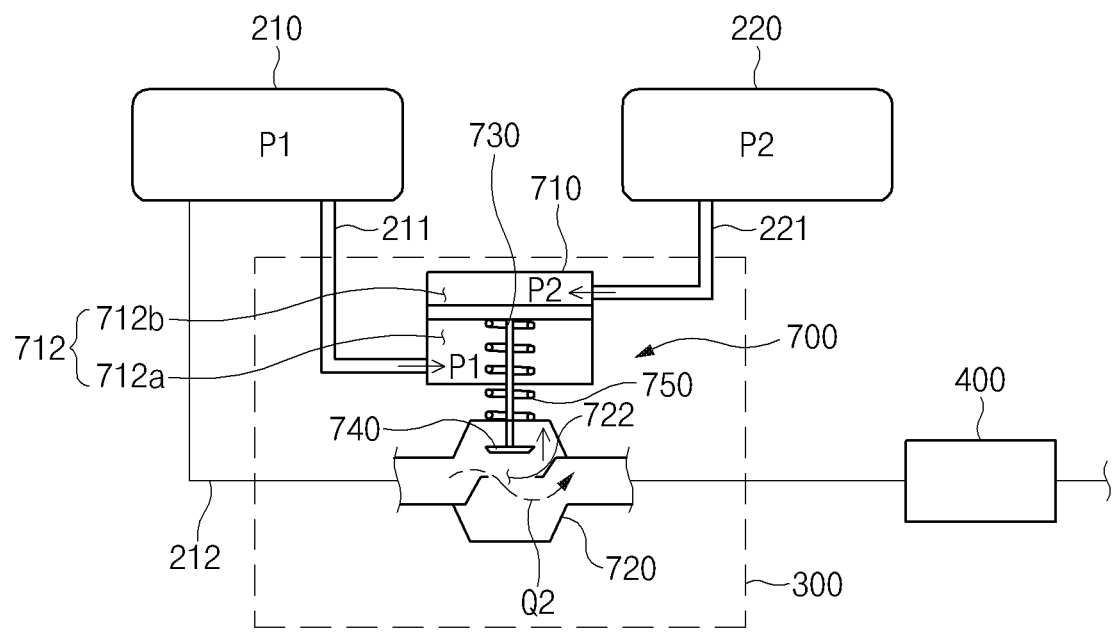
FIG. 3 is a view for explaining an operational structure of the flow rate adjusting valve of the hydrogen storage system according to the exemplary embodiment of the present disclosure.

Referring to FIGS. 1 to 3, a hydrogen storage system 10 according to an exemplary embodiment of the present disclosure includes: a first hydrogen tank 210 provided in a fuel cell electric vehicle 20; a second hydrogen tank 220 provided in the fuel cell electric vehicle 20 and configured to store hydrogen independently of the first hydrogen tank 210; a manifold 300 provided in the fuel cell electric vehicle 20 and connected to the first hydrogen tank 210 and the second hydrogen tank 220; a hydrogen supply line 24 configured to connect the manifold 300 to a fuel cell stack provided in the fuel cell electric vehicle 20; and a flow rate adjusting valve 700 configured to adjust a flow rate of hydrogen to be supplied to the manifold 300 from at least one of the first hydrogen tank 210 or the second hydrogen tank 220 in accordance with a difference in pressure between the first hydrogen tank 210 and the second hydrogen tank 220.

For reference, the hydrogen storage system 10 according to the exemplary embodiment of the present disclosure may be applied to supply hydrogen to the fuel cell electric vehicle 20 (e.g., a passenger vehicle or a commercial vehicle), and the present disclosure is not limited or restricted by types of objects to which the hydrogen storage system 10 is applied.

A receptacle 100 may be provided in the fuel cell electric vehicle 20, and a charging nozzle 102 for supplying hydrogen is connected to the receptacle 100.

Various types of receptacles 100, which may be connected (coupled) to the charging nozzle 102 with a typical coupling structure (e.g., a male-female coupling structure), may be used as the receptacle 100, and the present disclosure is not limited or restricted by the type and the structure of the receptacle 100.

In addition, the plurality of hydrogen tanks 210, 220, and 230 for storing hydrogen is provided in the fuel cell electric vehicle 20, and the manifold 300 is connected in common to the hydrogen tanks 210, 220, and 230.

As an example, the first hydrogen tank 210, the second hydrogen tank 220, and the third hydrogen tank 230 may be provided in the fuel cell electric vehicle 20, and the manifold 300 is connected in common to the plurality of hydrogen tanks 210, 220, and 230. According to another exemplary embodiment of the present disclosure, four or more or two or less hydrogen tanks may be provided in the fuel cell electric vehicle 20, and the present disclosure is not limited or restricted by the number of hydrogen tanks and the arrangement form of the hydrogen tanks.

The manifold 300 may have various structures capable of dividing a flow path of hydrogen, and the present disclosure is not limited or restricted by the type and the structure of the manifold 300. As an example, the manifold 300 may have a first port (not illustrated) connected to the hydrogen supply line 24, second to fourth ports (not illustrated) connected to the plurality of hydrogen tanks 210, 220, and 230, and a fifth port (not illustrated) connected to a hydrogen charging line 22.

For example, the first hydrogen tank 210 is connected to the manifold 300 by a first connection line 212, the second hydrogen tank 220 is connected to the manifold 300 by a second connection line 222, and the third hydrogen tank 230 is connected to the manifold 300 by a third connection line 232.

The hydrogen storage system 10 may include the hydrogen charging line 22 that connects the receptacle 100 and the manifold 300. The hydrogen, which is supplied to the receptacle 100 through the charging nozzle 102, flows through the hydrogen charging line 22 and the manifold 300, and then the respective hydrogen tanks 210, 220, and 230 are charged with the hydrogen.

In addition, the hydrogen storage system 10 includes the hydrogen supply line 24 that connects the manifold 300 and a fuel cell stack 600 provided in the fuel cell electric vehicle 20.

The hydrogen supply line 24 is provided to supply the fuel cell stack 600 with the hydrogen stored in the hydrogen tanks 210, 220, and 230.

In particular, the hydrogen supply line 24 is configured to connect the manifold 300 and the fuel cell stack 600 provided in the fuel cell electric vehicle 20, and the hydrogen stored in the hydrogen tanks 210, 220, and 230 is supplied to the fuel cell stack 600 via the manifold 300 and the hydrogen supply line 24.

For reference, the fuel cell stack 600 may have various structures capable of producing electricity by means of an oxidation-reduction reaction between fuel (e.g., hydrogen) and an oxidant (e.g., air).

As an example, the fuel cell stack 600 includes: a membrane electrode assembly (MEA) (not illustrated) having catalyst electrode layers, in which electrochemical reactions occur, at both sides of an electrolyte membrane through which hydrogen ions move; a gas diffusion layer (GDL) (not illustrated) configured to uniformly distribute reactant gases and serve to transfer generated electrical energy; a gasket (not illustrated) and a fastener (not illustrated) configured to maintain leakproof sealability for the reactant gases and a coolant and maintain an appropriate fastening pressure; and a separator (bipolar plate) (not illustrated) configured to move the reactant gases and the coolant.

In particular, in the fuel cell stack 600, hydrogen, which is fuel, and air (oxygen), which is an oxidant, are supplied to an anode and a cathode of the membrane electrode assembly, respectively, through flow paths in the separator, such that the hydrogen is supplied to the anode, and the air is supplied to the cathode.

The hydrogen supplied to the anode is decomposed into hydrogen ions (protons) and electrons by catalysts in the electrode layers provided at both sides of the electrolyte membrane. Only the hydrogen ions are selectively delivered to the cathode through the electrolyte membrane which is a positive ion exchange membrane, and at the same time, the electrons are delivered to the cathode through the gas diffusion layer and the separator which are conductors.

At the cathode, the hydrogen ions supplied through the electrolyte membrane and the electrons delivered through the separator meet oxygen in the air supplied to the cathode by an air supply device to create a reaction of producing water. Due to the movement of the hydrogen ions, the electrons flow through external conductive wires, and an electric current is produced due to the flow of the electrons.

In addition, the hydrogen supply line 24 is provided with a regulator 400 configured to depressurize hydrogen to be supplied to the fuel cell stack 600, and a hydrogen supply device (fuel processing system (FPS)) 500 configured to adjust the supply amount of hydrogen to be supplied to the fuel cell stack 600.

In particular, the regulator 400 is connected to the hydrogen supply line 24 and disposed between the manifold 300 and the fuel cell stack 600. The high-pressure (e.g., 700 bar) hydrogen supplied through the hydrogen supply line 24 may be supplied to the fuel cell stack 600 in a state in which the hydrogen is depressurized (e.g., 16 bar) while passing through the regulator 400.

The hydrogen supply device 500 is connected to the hydrogen supply line 24 and disposed between the regulator 400 and the fuel cell stack 600. The hydrogen supply device 500 adjusts the supply amount of hydrogen to be supplied to the fuel cell stack 600. In addition, the supply of the hydrogen to the fuel cell stack 600 may be selectively permitted or cut off by the hydrogen supply device 500.

The flow rate adjusting valve 700 is provided to adjust a flow rate of hydrogen to be supplied from the respective hydrogen tanks to the manifold 300 in accordance with a difference in pressure between the plurality of hydrogen tanks.

As an example, the flow rate adjusting valve 700 may be provided to adjust a flow rate of hydrogen supplied to the manifold 300 from at least one of the first hydrogen tank 210 or the second hydrogen tank 220 in accordance with a difference in pressure between the first hydrogen tank 210 and the second hydrogen tank 220.

Hereinafter, the configuration in which the flow rate adjusting valve 700 adjusts a flow rate of hydrogen to be supplied to the manifold 300 from the first hydrogen tank 210 in accordance with a difference in pressure between the first hydrogen tank 210 and the second hydrogen tank 220 will be described as an example.

According to another exemplary embodiment of the present disclosure, the flow rate adjusting valve 700 may adjust both flow rates of the hydrogen to be supplied to the manifold 300 from the first hydrogen tank 210 and the second hydrogen tank 220 in accordance with a difference in pressure between the first hydrogen tank 210 and the second hydrogen tank 220, or the flow rate adjusting valve 700 may adjust only a flow rate of the hydrogen to be supplied to the manifold 300 from the second hydrogen tank 220. Alternatively, the flow rate adjusting valve 700 may adjust a flow rate of the hydrogen to be supplied to the manifold 300 from at least one of the plurality of hydrogen tanks (e.g., the third hydrogen tank) in accordance with a difference in pressure between the first hydrogen tank 210 and the third hydrogen tank 230 or a difference in pressure between the second hydrogen tank 220 and the third hydrogen tank 230.

This is based on the fact that the pressure in the hydrogen tank may be adjusted by adjusting a flow rate of hydrogen to be discharged from the hydrogen tank (a flow rate of hydrogen to be supplied to the manifold). For example, when the pressure in the first hydrogen tank 210 becomes a first pressure and the pressure in the second hydrogen tank 220 becomes a second pressure lower than the first pressure, the pressure in the first hydrogen tank 210 may be decreased by increasing the flow rate of the hydrogen to be discharged from the first hydrogen tank 210 (supplied to the manifold), and as a result, the difference in pressure between the first hydrogen tank 210 and the second hydrogen tank 220 may be minimized. Alternatively, a deviation in pressure between the first hydrogen tank 210 and the second hydrogen tank 220 may be minimized by reducing the flow rate of the hydrogen to be discharged from the second hydrogen tank 220 and thus slowing down a decrease in pressure in the second hydrogen tank 220.

According to the exemplary embodiment of the present disclosure as described above, since the difference in pressure between the plurality of hydrogen tanks is minimized, it is possible to obtain an advantageous effect of preventing a sealing performance of a high-pressure hydrogen valve from deteriorating due to a deviation in pressure between the respective hydrogen tanks, an advantageous effect of inhibiting an increase in risk of leakage of hydrogen, and an advantageous effect of minimizing the occurrence of operating noise caused by chattering of the high-pressure hydrogen valve.

The flow rate adjusting valve 700 may have various structures capable of adjusting the flow rate of the hydrogen to be supplied to the manifold 300 from the hydrogen tank, and the structure of the flow rate adjusting valve 700 and a method of operating the flow rate adjusting valve 700 may be variously changed depending on required conditions and design specifications.

As an example, the flow rate adjusting valve 700 may be provided inside or outside the manifold 300.

According to the exemplary embodiment of the present disclosure, the flow rate adjusting valve 700 includes: a chamber housing 710 having an operating chamber 712 that communicates with the first hydrogen tank 210 and the second hydrogen tank 220; a first valve housing 720 having a first supply flow path 722 connected to the first hydrogen tank 210; a shaft 723; a piston member 730 configured to rectilinearly move in the operating chamber 712 in accordance with a difference in pressure between the first hydrogen tank 210 and the second hydrogen tank 220; and a first valve member 740 connected to one end of the piston member 730 by the shaft 723 and configured to adjust an opening ratio of the first supply flow path 722 by being moved in the first valve housing 720 by the piston member 730.

The chamber housing 710 may have various structures having the operating chamber 712 therein, and the present disclosure is not limited or restricted by the shape and the structure of the chamber housing 710.

In particular, the operating chamber 712 of the chamber housing 710 may be divided into a first space 712a and a second space 712b by the piston member 730. The first hydrogen tank 210 communicates with the first space 712a, and the second hydrogen tank 220 communicates with the second space 712b.

As an example, a first communication line 211 connected to the first hydrogen tank 210 may be connected to one side of the chamber housing 710 (e.g., below the piston member based on FIG. 2) so as to communicate with the first space 712a, and a second communication line 221 connected to the second hydrogen tank 220 may be connected to the other side of the chamber housing 710 (e.g., above the piston member based on FIG. 2) so as to communicate with the second space 712b.

For reference, in the exemplary embodiment of the present disclosure, the first space 712a and the second space 712b may be defined as spaces each having a volume that varies depending on a movement of the piston member 730 relative to the chamber housing 710.

The piston member 730 is provided to rectilinearly move in the operating chamber 712 in accordance with a difference in pressure between the first hydrogen tank 210 and the second hydrogen tank 220.

As an example, referring to FIGS. 2 and 3, the piston member 730 may be provided to be rectilinearly movable in an up-down direction in the operating chamber 712. Based on the piston member 730, the first space 712a may be defined at an upper side of the piston member 730, and the second space 712b may be defined at a lower side of the piston member 730.

For example, when a pressure in the first hydrogen tank 210 becomes a first pressure P1 and a pressure in the second hydrogen tank 220 becomes a second pressure P2 lower than the first pressure, the pressure P1 in the first space 712a becomes higher than the pressure P2 in the second space 712b, such that the piston member 730 moves upward. On the contrary, when a pressure in the second hydrogen tank 220 becomes higher than a pressure in the first hydrogen tank 210, a pressure in the second space 712b becomes higher than a pressure in the first space 712a, such that the piston member 730 moves downward.

The first valve housing 720 has the first supply flow path 722 connected to the first hydrogen tank 210 and may be provided adjacent to the chamber housing 710.

The first supply flow path 722 may have various structures capable of being selectively opened or closed by the first valve member 740, and the present disclosure is not limited or restricted by the structure and the shape of the first supply flow path 722. As an example, the first valve member 740, which rectilinearly moves in the up-down direction, may selectively open or close the first supply flow path 722 or adjust an opening ratio of the first supply flow path 722.

The first valve member 740 is connected to one end of the piston member 730 and provided to adjust an opening ratio of the first supply flow path 722 while rectilinearly moving in the first valve housing 720 in accordance with the rectilinear movement of the piston member 730.

In this case, the adjustment of the opening ratio of the first supply flow path 722 is defined as the adjustment of a degree to which the first supply flow path 722 is opened (e.g., the adjustment of a cross-sectional area of the first supply flow path). A flow rate of hydrogen passing through the first supply flow path 722 may be adjusted by adjusting the opening ratio of the first supply flow path 722.

As an example, referring to FIG. 2, the first valve member 740 may open the first supply flow path 722 at a predetermined first opening ratio under a condition in which a pressure in the first hydrogen tank 210 and a pressure in the second hydrogen tank 220 are equal (or similar) to each other. When the first supply flow path 722 is opened at the first opening ratio, the hydrogen stored in the first hydrogen tank 210 may be supplied to the manifold 300 at a predetermined flow rate Q1.

In contrast, referring to FIG. 3, when the pressure P1 in the first hydrogen tank 210 is higher than the pressure P2 in the second hydrogen tank 220, the piston member 730 moves upward, such that the first valve member 740 connected to the piston member 730 opens the first supply flow path 722 at a second opening ratio larger than the first opening ratio. A flow rate Q2 of the hydrogen to be supplied to the manifold 300 may be higher in a state in which the first supply flow path 722 is opened at the second opening ratio than in a state in which the first supply flow path 722 is opened at the first opening ratio (Q2>Q1).

As described above, when the pressure P1 in the first hydrogen tank 210 becomes higher than the pressure P2 in the second hydrogen tank 220, a flow rate of the hydrogen to be supplied from the first hydrogen tank 210 to the manifold 300 is increased, such that the amount of usage of hydrogen in the first hydrogen tank 210 may become larger than the amount of usage of hydrogen in the second hydrogen tank 220. As a result, it is possible to decrease the pressure in the first hydrogen tank 210 in accordance with the pressure in the second hydrogen tank 220.

According to the exemplary embodiment of the present disclosure, the hydrogen storage system 10 may include a spring member 750 configured to elastically support the movement of the piston member 730 relative to the chamber housing 710.

A typical elastic member capable of elastically supporting the rectilinear movement of the piston member 730 may be used as the spring member 750, and the present disclosure is not limited or restricted by the type and the structure of the spring member 750.

As an example, under a condition in which a pressure in the first hydrogen tank 210 and a pressure in the second hydrogen tank 220 are equal (or similar) to each other, the spring member 750 may provide elastic force so that the first valve member 740 moves to a position at which the first valve member 740 opens the first supply flow path 722 at the predetermined first opening ratio.

In the described and depicted exemplary embodiment of the present disclosure, the example in which the flow rate adjusting valve 700 is mounted in the manifold 300 has been described. However, according to another exemplary embodiment of the present disclosure, the flow rate adjusting valve 700 may be mounted in at least one of the first connection line 212 or the second connection line 222 (or the third connection line) and may adjust a flow rate of the hydrogen to be supplied through the first connection line 212 and the second connection line 222.

Figure 4:
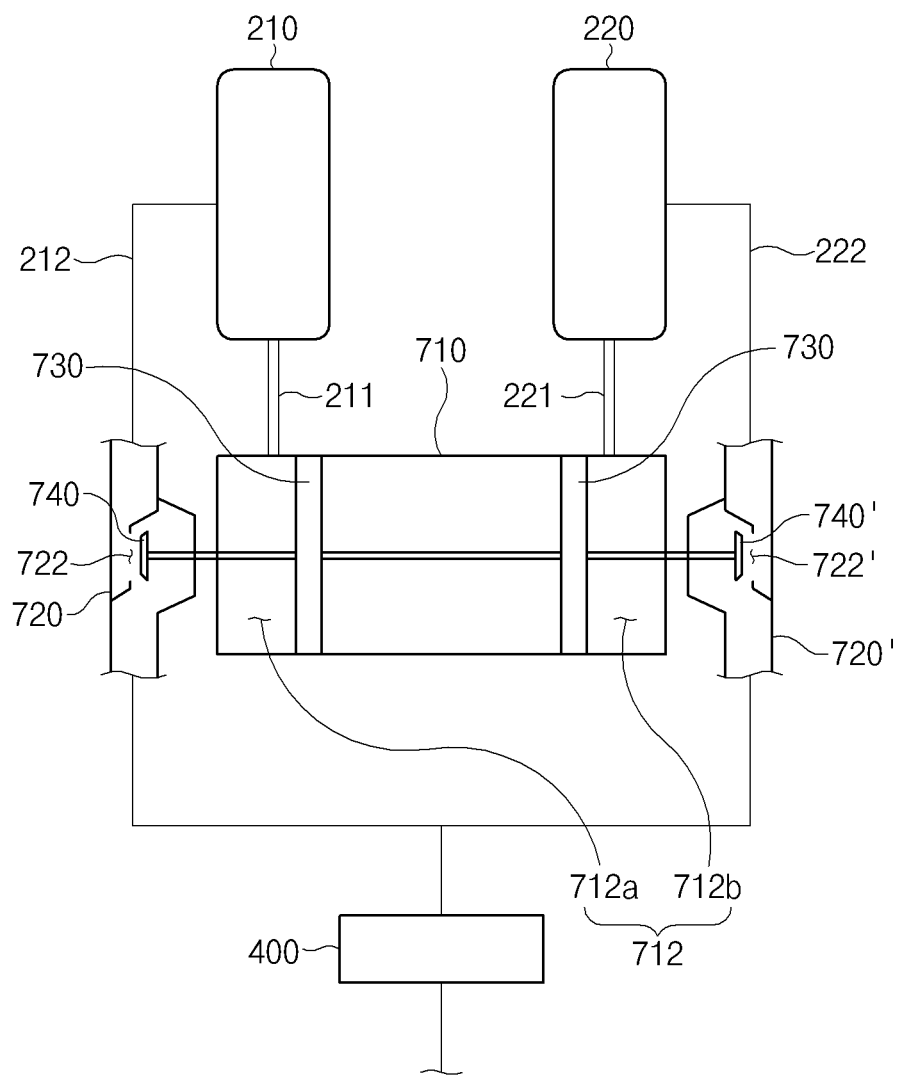
FIGS. 4 and 5 are views for explaining another exemplary embodiment of the flow rate adjusting valve of the hydrogen storage system according to the exemplary embodiment of the present disclosure.
Figure 5:
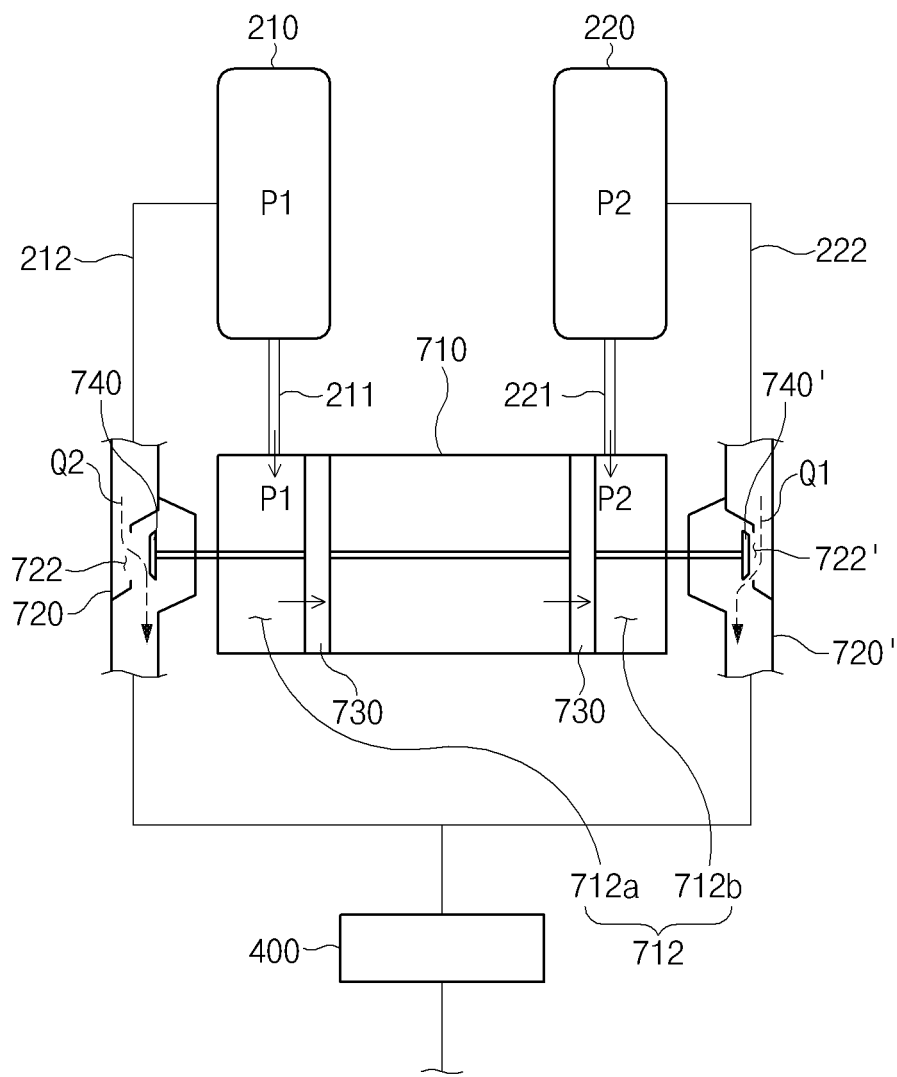

FIGS. 4 and 5 are views for explaining another exemplary embodiment of the flow rate adjusting valve of the hydrogen storage system according to the exemplary embodiment of the present disclosure. Further, the parts identical and equivalent to the parts in the above-mentioned configuration will be designated by the identical or equivalent reference numerals, and detailed descriptions thereof will be omitted.

Referring to FIGS. 4 and 5, a flow rate adjusting valve 700 may include: a chamber housing 710 having an operating chamber 712 that communicates with the first hydrogen tank 210 and the second hydrogen tank 220; a first valve housing 720 having a first supply flow path 722 connected to the first hydrogen tank 210; piston members 730 configured to rectilinearly move in the operating chamber 712 in accordance with a difference in pressure between the first hydrogen tank 210 and the second hydrogen tank 220; a first valve member 740 connected to one end of the piston member 730 and configured to adjust an opening ratio of the first supply flow path 722 by being moved in the first valve housing 720 by the piston member 730; a second valve housing 720' having a second supply flow path 722' connected to the second hydrogen tank 220; and a second valve member 740' connected to the other end of the piston member 730 and configured to adjust an opening ratio of the second supply flow path 722' by being moved in the second valve housing 720' by the piston member 730.

This is to adjust both a flow rate of the hydrogen to be discharged from the first hydrogen tank 210 (supplied to the manifold) and a flow rate of the hydrogen to be discharged from the second hydrogen tank 220 (supplied to the manifold) in accordance with a difference in pressure between the first hydrogen tank 210 and the second hydrogen tank 220.

By adjusting both the flow rates of the hydrogen to be discharged from the first hydrogen tank 210 and the second hydrogen tank 220 as described above, it is possible to obtain an advantageous effect of more quickly and accurately correcting a deviation in pressure between the first hydrogen tank 210 and the second hydrogen tank 220.

The operating chamber 712 of the chamber housing 710 may be divided into a first space 712a and a second space 712b by the piston members 730. The first hydrogen tank 210 may communicate with the first space 712a, and the second hydrogen tank 220 may communicate with the second space 712b.

The piston member 730 is provided to rectilinearly move in the operating chamber 712 in accordance with a difference in pressure between the first hydrogen tank 210 and the second hydrogen tank 220.

As an example, referring to FIGS. 4 and 5, the piston member 730 may be provided to be rectilinearly movable in a left-right direction in the operating chamber 712. Based on the piston member 730, the first space 712a may be defined at a left side of the piston member 730, and the second space 712b may be defined at a right side of the piston member 730.

For example, when a pressure in the first hydrogen tank 210 becomes a first pressure P1 and a pressure in the second hydrogen tank 220 becomes a second pressure P2 lower than the first pressure, the pressure P1 in the first space 712a becomes higher than the pressure P2 in the second space 712b, such that the piston member 730 moves rightward (based on FIG. 5). On the contrary, when a pressure in the second hydrogen tank 220 becomes higher than a pressure of the first hydrogen tank 210, a pressure in the second space 712b becomes higher than a pressure in the first space 712a, such that the piston member 730 moves leftward.

In particular, the plurality of piston members 730 (e.g., two piston members 730) may be disposed in the operating chamber 712 so as to operate in conjunction with each other. Since the plurality of piston members 730 simultaneously and rectilinearly moves in the operating chamber 712 as described above, it is possible to obtain an advantageous effect of stably maintaining the arrangement state of the piston members 730 and improving operational stability.

The first valve housing 720 has the first supply flow path 722 connected to the first hydrogen tank 210 and may be provided adjacent to one side (e.g., a left side) of the chamber housing 710.

The first supply flow path 722 may have various structures capable of being selectively opened or closed by the first valve member 740, and the present disclosure is not limited or restricted by the structure and the shape of the first supply flow path 722. As an example, the first valve member 740, which rectilinearly moves in the left-right direction, may selectively open or close the first supply flow path 722 or adjust an opening ratio of the first supply flow path 722.

The first valve member 740 is connected to one end of the piston member 730 and provided to adjust an opening ratio of the first supply flow path 722 while rectilinearly moving in the first valve housing 720 in accordance with the rectilinear movement of the piston member 730.

The second valve housing 720' has the second supply flow path 722' connected to the second hydrogen tank 220 and may be provided adjacent to the other side (e.g., a right side) of the chamber housing 710.

The second supply flow path 722' may have various structures capable of being selectively opened or closed by the second valve member 740', and the present disclosure is not limited or restricted by the structure and the shape of the second supply flow path 722'. As an example, the second valve member 740', which rectilinearly moves in the left-right direction, may selectively open or close the second supply flow path 722' or adjust an opening ratio of the second supply flow path 722'.

The second valve member 740' is connected to one end of the piston member 730 and provided to adjust an opening ratio of the second supply flow path 722' while rectilinearly moving in the second valve housing 720' in accordance with the rectilinear movement of the piston member 730.

In particular, when a pressure in the first hydrogen tank 210 becomes the first pressure and a pressure in the second hydrogen tank 220 becomes the second pressure lower than the first pressure, the first valve member 740 moves in a first direction in which the first valve member 740 opens the first supply flow path 722, such that a flow rate of the hydrogen to be supplied from the first hydrogen tank 210 to the manifold 300 is increased. More particularly, at the same time when the first valve member 740 moves in the first direction, the second valve member 740' moves in the first direction in which the second valve member 740' closes the second supply flow path 722', such that a flow rate of the hydrogen to be supplied from the second hydrogen tank 220 to the manifold 300 is decreased.

Referring to FIG. 4, the first valve member 740 and the second valve member 740' may open the first supply flow path 722 and the second supply flow path 722' at a predetermined first opening ratio, respectively, under a condition in which a pressure in the first hydrogen tank 210 and a pressure in the second hydrogen tank 220 are equal (or similar) to each other. When the first supply flow path 722 and the second supply flow path 722' are opened at the first opening ratio, the hydrogen stored in the first hydrogen tank 210 and the second hydrogen tank 220 may be supplied to the manifold 300 at a predetermined flow rate.

In contrast, referring to FIG. 5, when the pressure P1 in the first hydrogen tank 210 becomes higher than the pressure P2 in the second hydrogen tank 220, the piston member 730 moves rightward (in the first direction), such that the first valve member 740 opens the first supply flow path 722 at a second opening ratio larger than the first opening ratio, and the second valve member 740' opens the second supply flow path 722' at a third opening ratio smaller than the first opening ratio.

In a state in which the first supply flow path 722 is opened at the second opening ratio and the second supply flow path 722' is opened at the third opening ratio (the third opening ratio<the second opening ratio), the flow rate Q2 of the hydrogen to be supplied to the manifold 300 through the first supply flow path 722 may be increased, and the flow rate Q1 of the hydrogen to be supplied to the manifold 300 through the second supply flow path 722' may be decreased.

As described above, when the pressure P1 in the first hydrogen tank 210 becomes higher than the pressure P2 in the second hydrogen tank 220, a flow rate of the hydrogen to be supplied from the first hydrogen tank 210 to the manifold 300 is increased, and simultaneously, a flow rate of the hydrogen to be supplied from the second hydrogen tank 220 to the manifold 300 is decreased, such that the amount of usage of hydrogen in the first hydrogen tank 210 may be increased and the amount of usage of hydrogen in the second hydrogen tank 220 may be decreased. As a result, it is possible to obtain an advantageous effect of more quickly eliminating a deviation in pressure between the first hydrogen tank 210 and the second hydrogen tank 220.

While the exemplary embodiments have been described above, but the exemplary embodiments are just illustrative and not intended to limit the present disclosure. It can be appreciated by those skilled in the art that various modifications and alterations, which are not described above, may be made to the present exemplary embodiment without departing from the intrinsic features of the present exemplary embodiment. For example, the respective constituent elements specifically described in the exemplary embodiments may be modified and then carried out. Further, it should be interpreted that the differences related to the modifications and alterations are included in the scope of the present disclosure defined by the appended claims.

According to the exemplary embodiment of the present disclosure as described above, it is possible to obtain an advantageous effect of minimizing a difference in pressure between the hydrogen tanks and improving safety and reliability.

In particular, according to the exemplary embodiment of the present disclosure, it is possible to obtain an advantageous effect of minimizing a difference in pressure between the hydrogen tanks by changing a flow rate of hydrogen to be supplied from the respective hydrogen tanks in accordance with the difference in pressure between the hydrogen tanks.

In addition, according to the exemplary embodiment of the present disclosure, it is possible to obtain an advantageous effect of improving leakproof sealability, reducing a risk of leakage of hydrogen, and minimizing chattering of the valve caused by a differential pressure.

What is claimed is:

1. A hydrogen storage system, comprising:
a first hydrogen tank provided in a fuel cell electric vehicle;
a second hydrogen tank provided in the fuel cell electric vehicle and configured to store hydrogen independently of the first hydrogen tank;
a manifold provided in the fuel cell electric vehicle and connected to the first hydrogen tank and the second hydrogen tank;
a hydrogen supply line configured to connect the manifold and a fuel cell stack provided in the fuel cell electric vehicle; and
a flow rate adjusting valve including a chamber housing having an operating chamber that communicates with the first hydrogen tank and the second hydrogen tank, wherein the valve is configured to:
actuate within the chamber housing in response to a difference in pressure between the first hydrogen tank and the second hydrogen tank; and
adjust a flow rate of the hydrogen to be supplied to the manifold from the first hydrogen tank and the second hydrogen tank;
wherein, when a pressure in the first hydrogen tank becomes a first pressure and a pressure in the second hydrogen tank becomes a second pressure lower than the first pressure, a flow rate of the hydrogen to be supplied from the first hydrogen tank to the manifold is increased and a flow rate of the hydrogen to be supplied from the second hydrogen tank to the manifold is decreased.

2. The hydrogen storage system of claim 1, wherein the flow rate adjusting valve comprises:
a first valve housing having a first supply flow path connected to the first hydrogen tank;
a piston member configured to rectilinearly move in the operating chamber in accordance with the difference in pressure between the first hydrogen tank and the second hydrogen tank; and
a first valve member connected to one end of the piston member and configured to adjust an opening ratio of the first supply flow path by being moved in the first valve housing by the piston member.

3. The hydrogen storage system of claim 2, wherein the operating chamber is divided into a first space and a second space by the piston member, the first hydrogen tank communicates with the first space, and the second hydrogen tank communicates with the second space.

4. The hydrogen storage system of claim 2, further comprising:
a spring member configured to elastically support a movement of the piston member relative to the chamber housing.

5. The hydrogen storage system of claim 3, further comprising:
a second valve housing having a second supply flow path connected to the second hydrogen tank; and
a second valve member connected to the other end of the piston member and configured to adjust an opening ratio of the second supply flow path by being moved in the second valve housing by the piston member.

6. The hydrogen storage system of claim 5, wherein when pressure in the first hydrogen tank becomes the first pressure and the pressure in the second hydrogen tank becomes the second pressure, the first valve member moves in a first direction in which the first valve member opens the first supply flow path, and the flow rate of the hydrogen to be supplied from the first hydrogen tank to the manifold is increased.

7. The hydrogen storage system of claim 6, wherein at a same time when the first valve member moves in the first direction, the second valve member moves in the first direction in which the second valve member closes the second supply flow path, and the flow rate of the hydrogen to be supplied from the second hydrogen tank to the manifold is decreased.

8. The hydrogen storage system of claim 2, wherein the flow rate adjusting valve is provided in the manifold.

9. The hydrogen storage system of claim 2, further comprising:
a first connection line configured to connect the first hydrogen tank and the manifold; and
a second connection line configured to connect the second hydrogen tank and the manifold,
wherein the flow rate adjusting valve is provided in at least one of the first connection line or the second connection line.

10. A flow rate adjusting valve configured to adjust a flow rate of hydrogen to be supplied to a manifold from at least one of a first hydrogen tank or a second hydrogen tank, the flow rate adjusting valve comprising:
a chamber housing having an operating chamber that communicates with the first hydrogen tank and the second hydrogen tank;
a first valve housing having a first supply flow path connected to the first hydrogen tank;
a shaft;
a piston member configured to rectilinearly move in the operating chamber in accordance with a difference in pressure between the first hydrogen tank and the second hydrogen tank; and
a first valve member connected to one end of the piston member by the shaft and configured to adjust an opening ratio of the first supply flow path by being moved in the first valve housing by the piston member.

11. The flow rate adjusting valve of claim 10, wherein the operating chamber is divided into a first space and a second space by the piston member, the first hydrogen tank communicates with the first space, and the second hydrogen tank communicates with the second space.

12. The flow rate adjusting valve of claim 10, further comprising:
a spring member configured to elastically support a movement of the piston member relative to the chamber housing.

13. The flow rate adjusting valve of claim 11, further comprising:
a second valve housing having a second supply flow path connected to the second hydrogen tank; and
a second valve member connected to the other end of the piston member by the shaft and configured to adjust an opening ratio of the second supply flow path by being moved in the second valve housing by the piston member.

14. The flow rate adjusting valve of claim 13, wherein when a pressure in the first hydrogen tank becomes a first pressure and a pressure in the second hydrogen tank becomes a second pressure lower than the first pressure, the first valve member moves in a first direction in which the first valve member opens the first supply flow path, and a flow rate of the hydrogen to be supplied from the first hydrogen tank to the manifold is increased.

15. The flow rate adjusting valve of claim 13, wherein at a same time when the first valve member moves in the first direction, the second valve member moves in the first direction in which the second valve member closes the second supply flow path, and a flow rate of the hydrogen to be supplied from the second hydrogen tank to the manifold is decreased.

\* \* \* \* \*